United States Patent
Yamaguchi

(10) Patent No.: US 11,201,042 B2
(45) Date of Patent: Dec. 14, 2021

(54) IMAGING MASS SPECTROMETRY DATA PROCESSING DEVICE

(71) Applicant: SHIMADZU CORPORATION, Kyoto (JP)

(72) Inventor: Shinichi Yamaguchi, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 17/053,399

(22) PCT Filed: May 30, 2018

(86) PCT No.: PCT/JP2018/020834
§ 371 (c)(1),
(2) Date: Nov. 6, 2020

(87) PCT Pub. No.: WO2019/229898
PCT Pub. Date: Dec. 5, 2019

(65) Prior Publication Data
US 2021/0225626 A1    Jul. 22, 2021

(51) Int. Cl.
*H01J 49/00*     (2006.01)
*H01J 49/16*     (2006.01)
(Continued)

(52) U.S. Cl.
CPC ...... *H01J 49/0004* (2013.01); *G01N 30/8624* (2013.01); *G01N 30/8637* (2013.01);
(Continued)

(58) Field of Classification Search
CPC ...... H01J 49/0004; H01J 49/164; H01J 49/40; H01J 49/0036; G01N 27/62; G01N 30/8624; G01N 30/8637; G01N 30/8679
(Continued)

(56) References Cited

U.S. PATENT DOCUMENTS

2005/0086017 A1* 4/2005 Wang ............... H01J 49/0027
    702/85
2005/0255606 A1* 11/2005 Ahmed ............ G06K 9/00503
    436/173
(Continued)

FOREIGN PATENT DOCUMENTS

JP     2017-032465 A      2/2017
JP     2017-173103 A      9/2017
WO     2017/183086 A1    10/2017

OTHER PUBLICATIONS

"iMScope TRIO Imaging Mass Microscope", Shimadzu Corporation, online, Searched on Mar. 16, 2018.
(Continued)

*Primary Examiner* — Kiet T Nguyen
(74) *Attorney, Agent, or Firm* — Sughrue Mion, PLLC

(57) ABSTRACT

A peak-waveform conversion processor detects a peak in a profile spectrum created based on data obtained in each micro area in a measurement area, and acquires a rod-like peak by performing centroid conversion processing on a waveform of the peak in a mountain shape. When receiving a precise m/z value Ma of a target compound and an allowable range $\Delta M$ of m/z, an image creator determines whether or not there is a rod-like peak in a range defined by "Ma±$\Delta M$", for each micro area. When there is a rod-like peak, a height value of the rod-like peak is defined as the signal intensity value of the target compound in the micro area. In contrast, when there is no rod-like peak in the range defined by "Ma±$\Delta M$", the signal intensity value of the target compound in the micro area is set to zero.

3 Claims, 4 Drawing Sheets

(51) Int. Cl.
*H01J 49/40* (2006.01)
*G01N 30/86* (2006.01)

(52) U.S. Cl.
CPC ...... *G01N 30/8679* (2013.01); *H01J 49/0036* (2013.01); *H01J 49/164* (2013.01); *H01J 49/40* (2013.01)

(58) Field of Classification Search
USPC ................................................ 250/281, 282
See application file for complete search history.

(56) References Cited

U.S. PATENT DOCUMENTS

| | | | |
|---|---|---|---|
| 2010/0239139 A1 | 9/2010 | Hunt et al. | |
| 2019/0115200 A1 | 4/2019 | Harada | |
| 2020/0279408 A1* | 9/2020 | Osoekawa | ........... G06K 9/4628 |
| 2020/0292509 A1* | 9/2020 | Osoekawa | ......... G01N 30/8634 |
| 2021/0242004 A1* | 8/2021 | Yamaguchi | ............. H01J 49/40 |

OTHER PUBLICATIONS

Yoann Gut et al., "Application of chemometric algorithms to MALDI mass spectrometry imaging of pharmaceutical tablets", Journal of Pharmaceutical and Biomedical Analysis, 2015, pp. 91-100, vol. 105.

"Hyoujun Gijutsu Shu" (Standard Technology Collection), Mass Spectrometry, Japan Patent Office, retrieved from the Internet: <URL:http://warp.da.ndl.go.jp/info:ndljp/pid/10342974/www.jpo.go.jp/shiryou/s_sonota/hyoujun_gijutsu/mass/2-4-1.pdf#1-1>, retrieved on Jun. 21, 2018, pp. 165-176.

International Search Report of PCT/JP2018/020834 dated Jul. 3, 2018 [PCT/ISA/210].

Written Opinion of PCT/JP2018/020834 dated Jul. 3, 2018 [PCT/ISA/237].

* cited by examiner

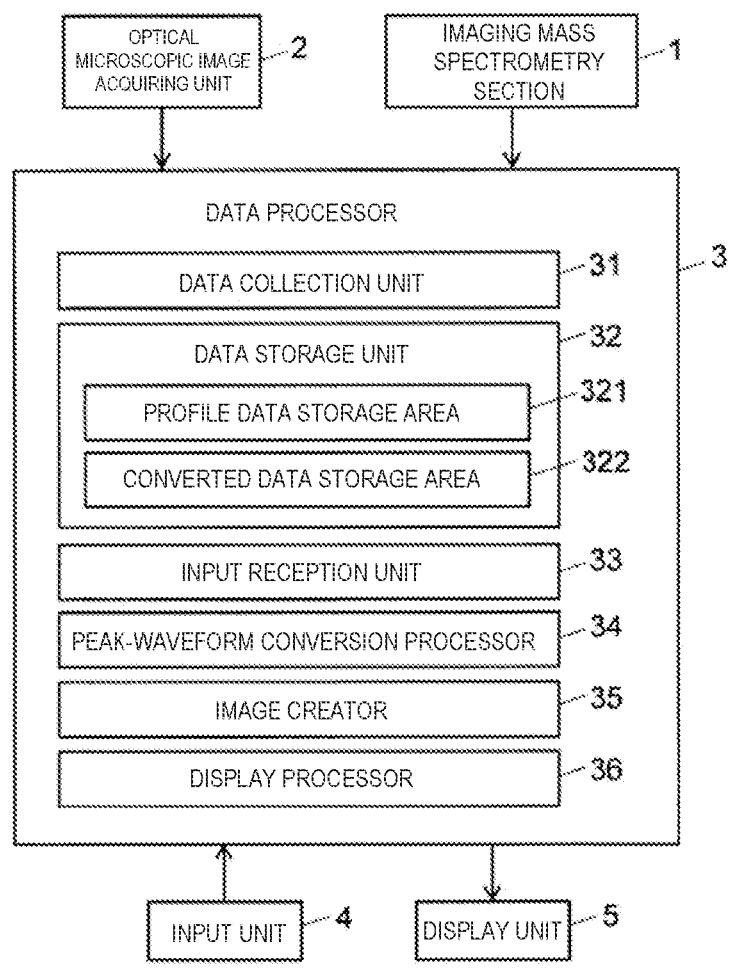

MEASURED PEAK

PEAK AFTER CENTROID CONVERSION PROCESSING

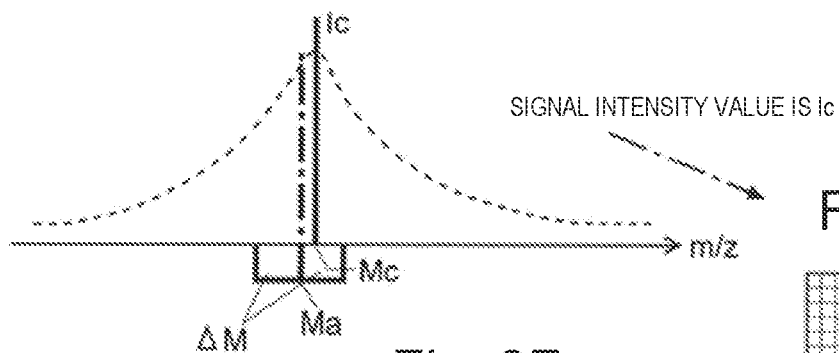
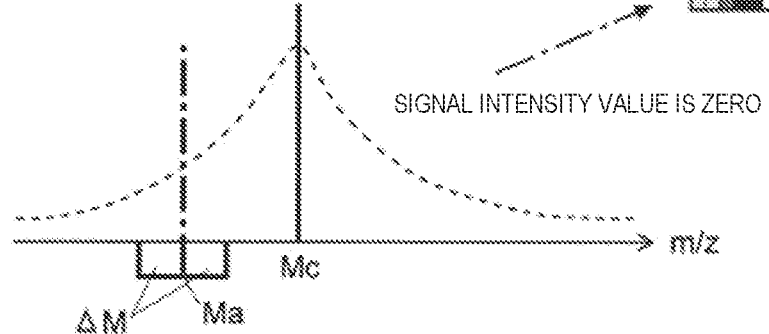
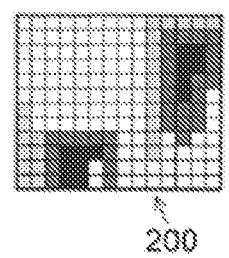

IMAGING MASS SPECTROMETRY DATA PROCESSING DEVICE

CROSS REFERENCE TO RELATED APPLICATIONS

This application is a National Stage of International Application No. PCT/JP2018/020834 filed on May 30, 2018.

TECHNICAL FIELD

The present invention relates to an imaging mass spectrometry data processing device configured to process mass spectrometry data on each of many micro areas in a measurement area on a sample, collected using an imaging mass spectrometer, and configured to create and display, for example, an image showing a two-dimensional intensity distribution of a specific compound.

BACKGROUND ART

An imaging mass spectrometer is capable of measuring a two-dimensional intensity distribution of ions having a specific mass-to-charge ratio m/z on the same sample surface while observing morphology of a surface of a sample such as a biological tissue section with an optical microscope (refer to Patent Literature 1, Non-Patent Literature 1, etc.). Observing a mass spectrometry image showing a two-dimensional intensity distribution of a compound-derived ion characteristically appearing in a specific disease such as cancer using an imaging mass spectrometer enables grasping progression of the disease and effect of treatment by medication or the like. For these reasons, in recent years, pharmacokinetic analysis of biological tissue sections and research for analyzing differences in compound distribution in each organ or in compound distribution between pathological sites, such as cancer, and normal sites, have been actively conducted using imaging mass spectrometers.

Although such an imaging mass spectrometer allows mass spectrometry to be performed over a predetermined mass-to-charge ratio range for each of many micro areas (measuring points) that are set in a measurement area on a sample or that are acquired by finely dividing the measurement area, data obtained in one micro area are profile data showing a continuous waveform in a mass-to-charge ratio direction. The imaging mass spectrometer includes a data processor, specifically, a computer for data processing, in which profile data for each micro area collected by measurement is stored in a memory device and a mass spectrometry image is created through data processing on this data.

A conventional typical imaging mass spectrometry data processing device (hereinafter, simply referred to as a "data processing device") creates a mass spectrometry image using, for example, the following procedure and data processing.

When a user wants to observe a two-dimensional distribution image of a compound in a sample, the user instructs execution of image creation processing after specifying a mass-to-charge ratio value M of the compound and an allowable range of the mass-to-charge ratio (hereinafter, simply referred to as an "allowable range") $\Delta M$. When the user specifies a compound name instead of specifying the mass-to-charge ratio value of the compound, the mass-to-charge ratio value corresponding to the compound name may be derived from a compound database. The allowable range is usually determined based on mass resolution of the imaging mass spectrometer. An imaging mass spectrometer typically uses a mass spectrometer having high mass resolution such as a time-of-flight mass spectrometer, and thus usually has a considerably small allowable range.

The data processing device instructed to start image creation searches for a range (a bin range, or hereinafter referred to as an "intensity integration range") for obtaining a peak intensity in which intensity data of a peak are integrated from profile data on each micro area stored in the memory device, where the "intensity integration range" includes a mass-to-charge ratio range (hereinafter referred to as a "precision mass range") acquired according to "$M \pm \Delta M$", where M is a specified mass-to-charge ratio value and $\Delta M$ is an allowable range for each micro area. FIGS. 3 and 4 are each a profile spectrum showing a relationship between the precision mass range and the intensity integration range.

In FIGS. 3 and 4, the center mass-to-charge ratio value of the peak formed using the profile data obtained by the measurement is Mm. This peak is ideally to be observed as a single vertical bar at the position of the mass-to-charge ratio value Mm with no width. But actually, the peak has a width due to error factors such as variations in repeated measurements in addition to limitation in the mass accuracy and resolution of the device itself. This peak width is generally wider than the accuracy range of the device at the center of the peak. The intensity integration range is set to substantially cover the width of this peak, so that the integrated intensity value of almost the entire peak, i.e., a signal intensity value corresponding to the area value of the peak, is regarded as the signal intensity value at the mass-to-charge ratio value Mm which is the center of the peak.

In FIGS. 3 and 4, the shape of the peak waveform, both of which centers on the mass-to-charge ratio value Mm, is identical, and thus has the same signal intensity value at the mass-to-charge ratio value Mm which is the center of the peak. Further, the precision mass range is included in the intensity integration range in FIGS. 3 and 4, so that the signal intensity value at the mass-to-charge ratio value Mm is considered as signal intensity corresponding to the compound specified by the user. When such processing is performed in each micro area, the signal intensity value for each micro area is obtained, and the signal intensity values are mapped to create a mass spectrometry image corresponding to the compound specified by the user.

However, the data of FIGS. 3 and 4 are different from each other as follows. The peak waveform of FIG. 3 includes the mass-to-charge ratio value Mm which is the peak center in the precise mass range. That is, the difference between the mass-to-charge ratio value Mm which is the peak center and the precise mass-to-charge ratio value of a target compound is within a range of device accuracy, so that it can be inferred that the mass-to-charge ratio value Mm which is the peak center calculated as described above substantially indicates the signal intensity value corresponding to the target compound. In contrast, although in the peak waveform of FIG. 4, the precision mass range is included in the intensity integration range, the mass-to-charge ratio value Mm which is the peak center is not included in the precision mass range. Thus, this peak may not actually correspond to the target compound intended by the user. That is, in the peak waveform of FIG. 4, the signal intensity value of a compound other than the target compound may be used to create a mass spectrometry image of the target compound. This causes the two-dimensional intensity distribution of the image to be impaired in accuracy.

CITATION LIST

Patent Literature

Patent Literature 1: WO 2017/183086 A
Patent Literature 2: JP 2017-32465 A

Non Patent Literature

Non Patent Literature 1: "iMScope TRIO Imaging Mass Microscope", [online], [Searched on Mar. 16, 2018], Shimadzu Corporation, Internet

SUMMARY OF INVENTION

Technical Problem

The present invention is made to solve the above problems, and it is an object of the present invention to provide an imaging mass spectrometry data processing device capable of improving accuracy of a two-dimensional intensity distribution image of a target compound desired to be observed by a user or of a mass-to-charge ratio value specified by the user.

Solution to Problem

A first aspect of the present invention made to solve the above problems is an imaging mass spectrometry data processing device configured to process mass spectrometry data which is profile data obtained from each of a plurality of micro areas in a measurement area on a sample, and that includes a) a peak waveform processor configured to apply centroid conversion processing to convert a peak having a waveform of a mountain shape formed from the profile data for each of the micro areas into a rod-like peak, and b) a distribution image creator configured to create an image showing a two-dimensional intensity distribution of a target compound or of a target mass-to-charge ratio value for each of the micro areas included in all or a part of the measurement area based on the rod-like peak included in a predetermined allowable range including a mass-to-charge ratio value corresponding to the target compound or the target mass-to-charge ratio value.

A second aspect of the present invention made to solve the above problems is an imaging mass spectrometry data processing device configured to process mass spectrometry data which is profile data obtained from each of a plurality of micro areas in a measurement area on a sample, and that includes a) a peak waveform processor configured to convert a peak having a waveform of a mountain shape formed from the profile data for each of the micro areas into a narrow peak having a peak width narrower than that of the peak centered on a mass center position determined from the waveform of the peak, and b) a distribution image creator configured to create an image showing a two-dimensional intensity distribution of a target compound or of a target mass-to-charge ratio value for each of the micro areas included in all or a part of the measurement area based on the narrow peak included in a predetermined allowable range including a mass-to-charge ratio value corresponding to the target compound or the target mass-to-charge ratio value.

The "mass spectrometry data" in the present invention includes not only simple mass spectrometry data that does not involve a dissociation operation for ions, but also $MS^n$ spectral data obtained by $MS^n$ analysis in which n is two or more. The data to be processed by the present invention is profile data in a predetermined mass-to-charge ratio range collected for each micro area in the measurement area. Although the type of the mass spectrometer for acquiring the mass spectrometry data is not particularly limited, a time-of-flight mass spectrometer is typically used.

The device of the first aspect of the present invention is configured such that the peak waveform processor creates a profile spectrum based on profile data obtained in each micro area, and applies centroid conversion processing to a peak having a waveform of a mountain shape, appearing in the profile spectrum. That is, the position of the center of gravity of the peak in a predetermined range (e.g., a range between a peak start point position and a peak end point position both according to a predetermined definition) of each peak waveform is acquired, and a rod-like peak located at the position of the center of gravity and having a height of a peak area value is acquired. The centroid conversion processing is a well-known technique frequently used in the field of mass spectrometry for creating a line spectrum as disclosed in Patent Literature 2, for example. Although the peak area value is typically used as the height of the rod-like peak, as described above, the height of a peak top of the profile spectrum may be simply used, or ionic strength in the mass-to-charge ratio at the mass center position may be used.

For example, when receiving an instruction to create a two-dimensional intensity distribution image of a certain compound for a part of the measurement area, the distribution image creator acquires a height (signal intensity value) of the rod-like peak included in the predetermined allowable range including the mass-to-charge ratio value corresponding to a target compound for each micro area included in the part of the measurement area, and creates an image showing a two-dimensional intensity distribution in the mass-to-charge ratio value of the target compound. When there is no rod-like peak in the predetermined allowable range including the mass-to-charge ratio value corresponding to the target compound in a certain micro area, the micro area has a signal intensity value of zero. The predetermined allowable range may be appropriately set by a user, or it typically corresponds to a value about the accuracy of the device itself.

The device of the second aspect of the present invention is configured such that the peak waveform processor creates a profile spectrum based on profile data obtained in each micro area, and converts a peak having a waveform of a mountain shape, appearing in the profile spectrum, into a narrow peak having a peak width narrower than that of the peak centered on the mass center position acquired from the waveform of the peak. Specifically, deconvolution processing, which is a well-known technique often used for peak separation and the like, may be used. The narrow peak in this case may have a peak width corresponding to a value about the accuracy of the mass spectrometer. This peak width is much smaller than the peak width of the peak appearing in the profile spectrum.

The distribution image creator acquires a signal intensity value defined as an area or the like of the narrow peak with a mass center position included in the predetermined allowable range including the mass-to-charge ratio value corresponding to a target compound for each micro area included in the part of the measurement area, and creates an image showing a two-dimensional intensity distribution in the mass-to-charge ratio value of the target compound. When there is no narrow peak with a mass center position included in the predetermined allowable range including the mass-to-charge ratio value corresponding to the target compound in a certain micro area, the micro area has a signal intensity value of zero.

When a predetermined allowable range including a mass-to-charge ratio value corresponding to a target compound desired to be observed by a user exists at a hem (leading or tailing) of a peak in a mountain shape appearing in a profile spectrum, a conventional device can still use the integrated value of signal intensity of the peak as the signal intensity value for a target compound. However, the first and second aspects of the present invention do not allow the signal intensity value of the peak to be reflected to the signal intensity value for the target compound. That is, even when a peak on a profile spectrum acquired by measurement has a large width, a considerably large difference between a center position of the peak and a precise mass-to-charge ratio value corresponding to the target compound does not allow signal intensity of the peak to be reflected in a two-dimensional intensity distribution of the target compound. This enables preventing a signal intensity value of another compound other than the target compound from constituting a part of the two-dimensional intensity distribution of the target compound.

As described above, the peak area is typically calculated and the area value is used as the height of the rod-like peak in the centroid conversion processing. By setting a mass-to-charge ratio range for calculating the peak area to a range substantially corresponding to the accuracy of the mass spectrometer, most of the hem of the peak in a mountain shape is excluded from calculation. Since the hem of the peak in a mountain shape tends to have more unstable signal intensity than the vicinity of the top of the peak, excluding the signal intensity at the hem from the calculation improves accuracy of the height of the rod-like peak.

Thus, the imaging mass spectrometry data processing device of the first aspect is preferably configured such that when converting a peak in a mountain shape into a rod-like peak using the centroid conversion processing, the peak waveform processor acquires a height of the rod-like peak by integrating signal intensity in a range corresponds to the accuracy of the mass spectrometer for the peak in a mountain shape.

Advantageous Effects of Invention

The present invention enables improving accuracy of a two-dimensional intensity distribution image of a target compound desired to be observed by a user or of a mass-to-charge ratio value specified by the user, i.e., accuracy of a mass spectrometry image.

BRIEF DESCRIPTION OF DRAWINGS

FIG. 1 is a schematic block diagram of an imaging mass spectrometer including a spectrometry data processing device according to an embodiment of the present invention.

FIGS. 2A-2G are explanatory views of MS image creation processing in an imaging mass spectrometer of the present embodiment.

DESCRIPTION OF EMBODIMENTS

Figure 2A:
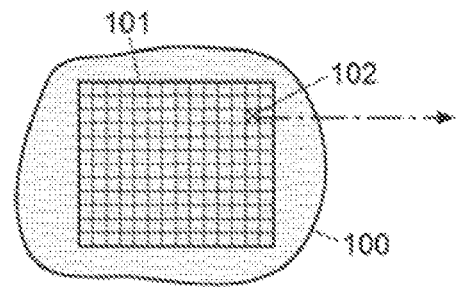

Hereinafter, an imaging mass spectrometer including an imaging mass spectrometry data processing device according to an embodiment of the present invention will be described with reference to the accompanying drawings.

FIG. 1 is a schematic configuration diagram of the imaging mass spectrometer according to the present embodiment. FIGS. 2A-2G are explanatory diagrams of MS image creation processing in the imaging mass spectrometer of the present embodiment.

The imaging mass spectrometer of the present embodiment includes an imaging mass spectrometry section 1 that performs measurement on a sample, an optical microscopic image acquiring unit 2 that captures an optical micro image on the sample, a data processor 3, and an input unit 4 and a display unit 5 each serving as a user interface.

The imaging mass spectrometry section 1 includes an matrix-assisted laser desorption/ionization ion trap time-of-flight mass spectrometer, for example, and performs mass spectrometry on the many micro areas 102 in the two-dimensional measurement area 101 on the sample 100 such as a biological tissue section to acquire mass spectrometry data for each micro area, as shown in FIG. 2A. Here, the mass spectrometry data is mass spectrum data over a predetermined mass-to-charge ratio range, but may be MS$^n$ spectrum data for a specific precursor ion. The optical microscopic image acquiring unit 2 is an optical microscope with an image acquiring unit added, and acquires a microscopic image of a two-dimensional region on a surface of a sample.

The data processor 3 performs predetermined processing after receiving mass spectrum data in each micro area collected by the imaging mass spectrometry section 1, and includes a data collection unit 31, a data storage unit 32, an input reception unit 33, a peak-waveform conversion processor 34, an image creator 35, and a display processor 36, as functional blocks. The data storage unit 32 includes a profile data storage area 321 for storing raw data collected by measurement using the imaging mass spectrometry section 1 and a converted data storage area 322 for storing data processed by the peak waveform conversion processing described later.

In general, the data processor 3 is in fact a personal computer (or a higher-performance workstation), and is configured to execute a function of each of the blocks by operating dedicated software installed in the computer on the computer. In that case, the input unit 4 is a pointing device such as a keyboard or a mouse, and the display unit 5 is a display monitor.

Next, sample measurement work using the imaging mass spectrometer of the present example will be described.

First, when an operator (user) sets the sample 100 to be analyzed at a predetermined measurement position in the optical microscopic image acquiring unit 2 and performs a predetermined operation using the input unit 4, the optical microscopic image acquiring unit 2 captures an image of a surface of the sample 100 and displays the image on a screen of the display unit 5. The operator indicates a measurement area, which is all or a part of the sample 100, on the image using the input unit 4.

The operator temporarily takes out the sample 100 from the device and attaches a matrix for MALDI to the surface of the sample 100. Then, the operator sets the sample 100 with the matrix attached at a predetermined measurement position in the imaging mass spectrometry section 1, and performs a predetermined operation using the input unit 4. This allows the imaging mass spectrometry section 1 to acquire mass spectrometry data over a predetermined mass-to-charge ratio range by performing mass spectrometry on each of the many micro areas in the measurement area indicated as described above on the sample 100. At this time, the data collection unit 31 performs so-called profile acquisition to collect profile data that is a continuous waveform in a mass-to-charge ratio direction within the mass-to-charge ratio range, and then stores the profile data in the profile data storage area 321 of the data storage unit 32. As a matter of course, the profile data storage area 321 stores a column of digitized data of samples acquired by sampling continuous profile waveforms at a predetermined sampling interval (sufficiently smaller than a peak width of each waveform).

When a pattern on a sample surface (borders of different tissues, etc.) can be observed relatively clearly even with the matrix attached to the sample surface, the optical microscopic image acquiring unit 2 may capture an image after the matrix is preliminarily attached to the sample surface.

After measurement of the sample 100 targeted is completed, the operator specifies a compound for which the two-dimensional intensity distribution in the sample 100 is to be determined (hereinafter referred to as a "target compound") from the input unit 4. The input reception unit 33 receives this input information. When the target compound is specified, the input reception unit 33 acquires a precise mass-to-charge ratio value (typically a theoretical value of a mass-to-charge ratio) corresponding to the specified compound with reference to a compound database or the like stored preliminarily.

The target compound can be specified by a method of directly inputting a compound name or selecting a compound from a compound list prepared preliminarily, for example. To specify a plurality of target compounds, although the target compounds may be specified one by one by the above method, a plurality of target compounds may be preliminarily listed to allow a plurality of target compounds listed in the list to be collectively specified by selecting the list. Instead of specifying the target compound, a mass-to-charge ratio value Ma (hereinafter referred to as a "target mass-to-charge ratio value") for which a two-dimensional intensity distribution is to be determined may be directly specified.

The operator also specifies an allowable range ΔM of a mass-to-charge ratio assumed while specifying the target compound or the target mass-to-charge ratio value. However, when specifying a plurality of target compounds or target mass-to-charge ratio values, the operator does not necessarily specify an allowable range for each target compound or target mass-to-charge ratio, and thus the allowable range may be common to all the target compounds or the target mass-to-charge ratios, for example. Additionally, instead of specifying an allowable range using a numerical value of a unit of a mass-to-charge ratio such as "Da" or "u", the allowable range may be specified using a ratio to a mass-to-charge ratio value to be the center, such as "ppm". As a matter of course, other specification methods may be used. What is important is that some allowable range is set for each target compound or each target mass-to-charge ratio. Thus, regardless of whether a target compound or a target mass-to-charge ratio value is specified, information on the mass-to-charge ratio value Ma to be the center and the allowable range ΔM can be obtained for each target compound or each target mass-to-charge ratio value.

Figure 2B:
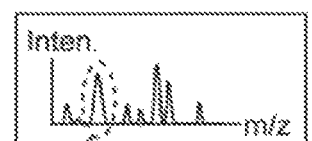
Figure 2C:
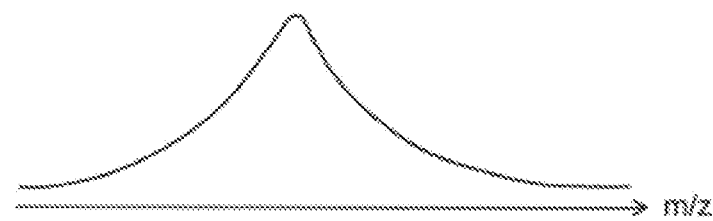
Figure 2D:
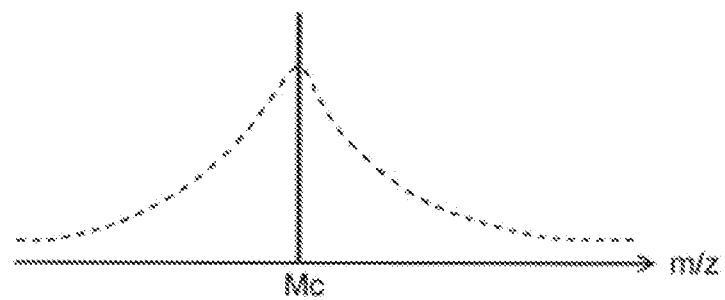
Figure 3:
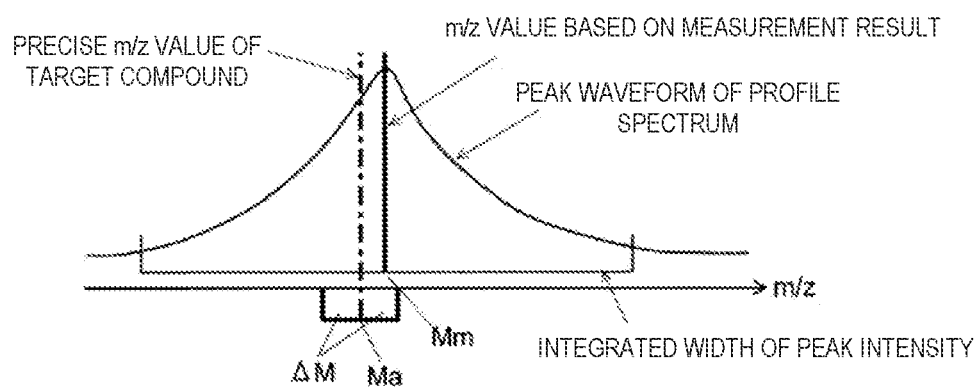
FIG. 3 is a diagram showing an example of a relationship between a precision mass range corresponding to a target compound and an intensity integration range of a peak acquired by measurement.

The peak-waveform conversion processor 34 reads out profile data in a predetermined mass-to-charge ratio range near a mass-to-charge ratio value M specified for each micro area from the profile data storage area 321 and forms a profile spectrum (refer to FIGS. 2B and 2C). Then, the peak-waveform conversion processor 34 detects a peak in a mountain shape appearing in the profile spectrum for each micro area, and performs centroid conversion processing on the peak detected. For the centroid conversion processing, for example, a well-known algorithm described in Patent Literature 2 or the like may be used, and a position of the center of gravity and an area value of the peak in a mountain shape are typically calculated. Then, the position of the center of gravity, i.e., a mass-to-charge ratio value, is defined as a position of a rod-like peak, and the area value is defined as the height of the rod-like peak, i.e., the signal intensity value. This allows one peak in a mountain shape to be converted into one rod-like peak, as shown in FIG. 2D.

Instead of detecting a peak in a profile spectrum in a predetermined mass-to-charge ratio range near the mass-to-charge ratio value Ma specified, peaks may be detected in a profile spectrum of the entire mass-to-charge ratio range acquired by measurement, and then the centroid conversion processing may be performed on each of the peaks detected. When data constituting a mass spectrum including the rod-like peak acquired by performing the centroid conversion processing as described above is stored in the converted data storage area 322 of the data storage unit 32, image creation processing described later can be performed without performing the centroid conversion processing on the same profile spectrum again.

The image creator 35 calculates a mass-to-charge ratio range [Ma−ΔM to Ma+ΔM] from the mass-to-charge ratio value Ma and the allowable range ΔM for each target compound or for each target mass-to-charge ratio value in each micro area. Then, the image creator 35 determines whether or not a rod-like peak exists in the mass-to-charge ratio range [Ma−ΔM to Ma+ΔM], and when the rod-like peak exists in the mass-to-charge ratio range [Ma−ΔM to Ma+ΔM], the height (signal intensity value) Ic of the rod-like peak is regarded as the signal intensity value corresponding to the target compound in the micro area, as shown in FIG. 2E. In contrast, when the rod-like peak does not exist in the mass-to-charge ratio range [Ma−ΔM to Ma+ΔM] as shown in FIG. 2F, a signal intensity value corresponding to the target compound in the micro area is set to zero.

Then, the image creator 35 determines a signal intensity value corresponding to each micro area by performing similar processing in each micro area. This allows a signal intensity value of each of the many micro areas 102 included in the measurement area 101 to be acquired for each target compound or each target mass-to-charge ratio value. Then, the signal intensity values are two-dimensionally disposed corresponding to positions of the micro areas and display colors are applied to the respective signal intensity values according to a predetermined color scale to create a heat map-like mass spectrometry image 200 as shown in FIG. 2G. The display processor 36 causes the mass spectrometry image 200 created for each of the target compound and the target mass-to-charge ratio value to be displayed on the screen of the display unit 5 in the form of a list, for example.

Figure 4:
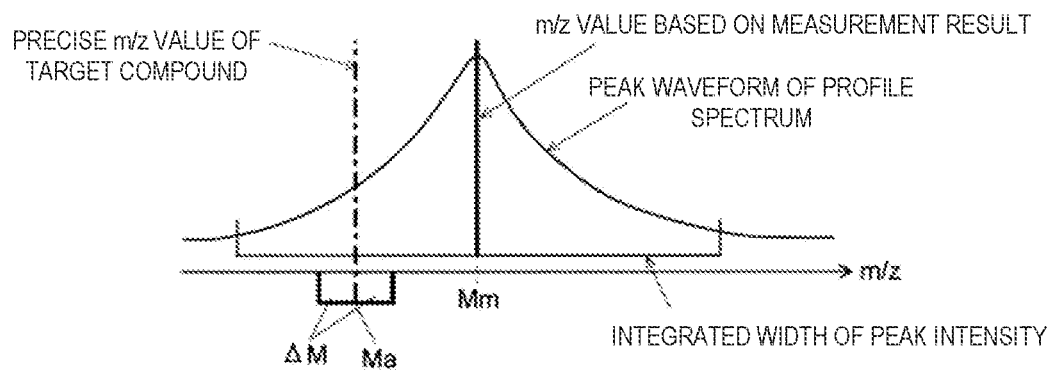
FIG. 4 is a diagram showing an example of a relationship between a precision mass range corresponding to a target compound and an intensity integration range of a peak acquired by measurement.

As already described with reference to FIG. 4, when a relationship between the mass-to-charge ratio range [Ma−ΔM to Ma+ΔM] and the peak in a mountain shape (a dotted line in FIG. 2F) corresponds to a state shown in FIG. 2F, a conventional device uses an integrated value of signal intensity of the peak in a mountain shape as the signal intensity value of the target compound. Thus, signal intensity of a compound different from the target compound may be reflected in the mass spectrometry image of the target compound. In contrast, when a relationship between the mass-to-charge ratio range [Ma−ΔM to Ma+ΔM] and the rod-like peak corresponds to the state shown in FIG. 2F, the device of the present embodiment causes a signal intensity value of the target compound to be set to zero. Thus, signal intensity of a compound different from the target compound is less likely to be reflected in the mass spectrometry image of the target compound, so that accuracy of the two-dimensional intensity distribution in the mass spectrometry image of the target compound can be improved.

The peak subjected to the centroid conversion processing typically has a height that is an area value of an original peak in a mountain shape. Although the area value corresponds to an integrated value of signal intensity over a range from a start point to an end point of the peak, a calculation range of an area of the peak may be narrower than the range from the start point to the end point of the peak. For example, when the calculation range of the area of the peak is set to a range of positions across the top of the peak, each having signal intensity with a signal intensity value acquired by multiplying a signal intensity value at the top of the peak by a (a is more than zero and less than one) and a is set to about 0.3 to 0.7, most of a hem of the peak is excluded from the calculation range of the area of the peak. Although a profile spectrum often has signal intensity in a hem of a peak, being unstable and poor in reproducibility, excluding most of the hem of the peak from a calculation range of an area of the peak as described above enables a peak area value, i.e., accuracy of a signal intensity value in each micro area, to be improved.

Instead of the peak area value, the height of the top of the peak of the profile spectrum (a maximum signal intensity value) may be used as the height of the peak subjected to the centroid conversion processing, or ion intensity in a mass-to-charge ratio at a mass center position of the peak in the profile spectrum may be used.

Although the device of the above embodiment allows the peak-waveform conversion processor 34 to perform centroid conversion processing on a peak in a mountain shape to convert the peak into a rod-like peak, a waveform processing method other than the centroid conversion processing may be used as long as a peak in a mountain shape can be converted into a rod-like peak or a narrow peak other than the rod-like peak, having a peak width sufficiently smaller than that of the peak in a mountain shape.

Reconstructing data constituting the peak by using deconvolution using a predetermined distribution function such as the Gaussian function enables calculating a peak having a peak width corresponding to about accuracy of the mass spectrometer. The deconvolution is a type of digital filter, and is a process of returning a convolved signal to a signal before convolution. In the case of this example, it is assumed that a peak with a very narrow peak width at the peak center position is the signal before convolution, and this signal is convolved in a signal having a predetermined spread showing a Gaussian function distribution, for example, using a convolution function due to responsivity and stability of the device. Returning the signal having the predetermined spread to a signal before convolution using the deconvolution enables a narrow peak to be obtained. As a matter of course, a narrow peak may be obtained by using another waveform processing method.

The embodiment described above is only an example of the present invention. Thus, even when alteration, modification, or addition is appropriately applied to the embodiment within the scope of the spirit of the present invention, the embodiment is clearly included in the scope of claims of the present application.

REFERENCE SIGNS LIST

1 . . . Imaging Mass Spectrometry Section
2 . . . Optical Microscopic Image Acquiring Unit
3 . . . Data Processor
31 . . . Data Collection Unit
32 . . . Data Storage Unit
321 . . . Profile Data Storage Area
322 . . . Converted Data Storage Area
33 . . . Input Reception Unit
34 . . . Peak-waveform Conversion Processor
35 . . . Image Creator
36 . . . Display Processor
4 . . . Input Unit
5 . . . Display Unit
100 . . . Sample
101 . . . Measurement Area
102 . . . Micro Area (Measurement Point)
200 . . . Mass Spectrometry Image

The invention claimed is:

1. An imaging mass spectrometry data processing device configured to process mass spectrometry data which is profile data obtained from each of a plurality of micro areas in a measurement area on a sample, the imaging mass spectrometry data processing device comprising:
   a) a peak waveform processor configured to apply centroid conversion processing to convert a peak having a waveform of a mountain shape formed from the profile data for each of the micro areas into a rod-like peak; and
   b) a distribution image creator configured to create an image showing a two-dimensional intensity distribution of a target compound or of a target mass-to-charge ratio value for each of the micro areas included in all or a part of the measurement area based on the rod-like peak included in a predetermined allowable range including a mass-to-charge ratio value corresponding to the target compound or the target mass-to-charge ratio value.

2. The imaging mass spectrometry data processing device according to claim 1, wherein
   when converting a peak in a mountain shape into a rod-like peak using the centroid conversion processing, the peak waveform processor acquires a height of the rod-like peak by integrating signal intensity in a range corresponds to accuracy of a mass spectrometer for the peak in a mountain shape.

3. An imaging mass spectrometry data processing device configured to process mass spectrometry data which is profile data obtained from each of a plurality of micro areas in a measurement area on a sample, the imaging mass spectrometry data processing device comprising:
   a) a peak waveform processor configured to convert a peak having a waveform of a mountain shape formed from the profile data for each of the micro areas into a narrow peak having a peak width narrower than that of the peak centered on a mass center position determined from the waveform of the peak; and b) a distribution image creator configured to create an image showing a two-dimensional intensity distribution of a target compound or of a target mass-to-charge ratio value for each of the micro areas included in all or a part of the measurement area based on the narrow peak included in a predetermined allowable range including a mass-to-charge ratio value corresponding to the target compound or the target mass-to-charge ratio value.

\* \* \* \* \*